UNITED STATES PATENT OFFICE.

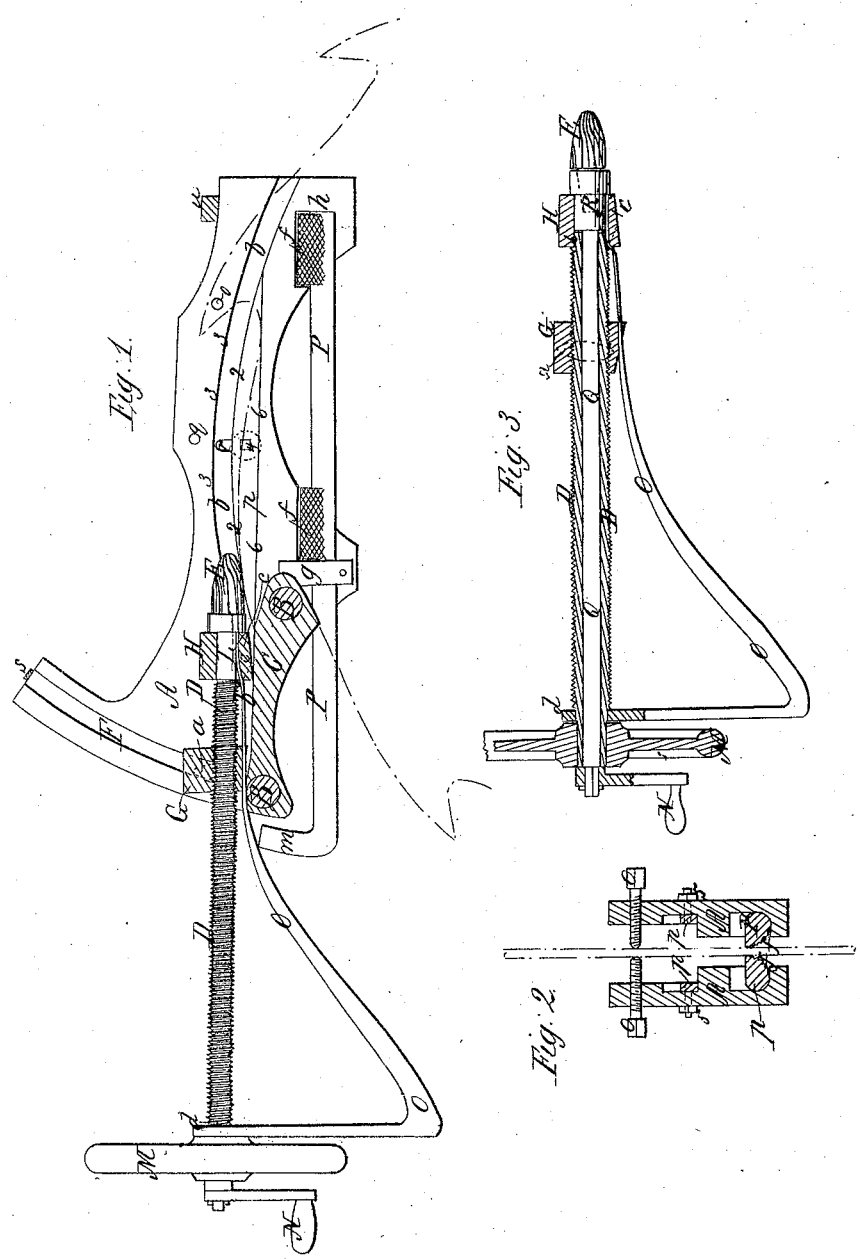

K. H. KINNE, OF MEXICO, NEW YORK.

APPARATUS FOR CUTTING TEETH IN SAWS.

Specification of Letters Patent No. 24,466, dated June 21, 1859.

*To all whom it may concern:*

Be it known that I, K. H. KINNE, of Mexico, in the county of Oswego and State of New York, have invented certain new and useful Improvements in Machines for Cutting Teeth Upon Straight or Circular Saws; and I do hereby declare that the following is a full, clear, and exact description of the construction and operation of the same, reference being had to the accompanying drawings, in which—

Figure 1, represents a longitudinal vertical section through said machine. Fig. 2, represents a vertical cross section through the same. Fig. 3, represents a longitudinal section through the screw shaft, to which the bur or cutting tool is secured.

The nature of my invention relates to the manner of making the machine adjustable so as to enable the operator to sharpen the teeth of circular as well as straight saws with equal facility.

To enable others skilled in the art to make and use my invention, I will proceed to describe its construction and operation.

A represents two metal plates which are secured together by means of the screw bolts B.

C, represents a metal bed piece which is secured between the plates A, by the screws B, passing through it, and which serves as an anvil for the saw tooth to rest upon while being sharpened.

D, represents a screw shaft which has its bearings in the nuts G, and H, in such a manner that it can screw through the nut G, while its bearing in the nut H, is smooth, and it is held therein by a pin I, which permits the screw to turn.

M, represents a hand wheel which is keyed on to the end of the screw shaft D, and by which it is turned.

Q, represents a round shaft which is fitted within the hollow screw shaft D, in such a manner that it can be turned independently of the same by means of the crank N, and the head R, of said shaft turns within the nut H, as its bearing.

E, represents the cutting tool, or bur which I use for cutting or shaping the saw teeth; its shank is secured within a socket of the head R. It will be seen that the bur E, is operated by turning the crank N, while its feed is effected by turning the hand wheel M, and screw D. The plates A, are formed on their inner sides with two sets of grooves F, and b, the groove F is intended to guide the nut G, in its upward motion, which is done by the tongue a, of the nut F, fitting in said groove, while the nut H, moves along the groove b, by the action of the tongue C, playing in said groove. p, is a curved switch which constitutes one side of the groove b, and which is secured to the plate A, by means of a screw bolt 4, and nut 5, the bolt passing through a slot r, and when the screw nut is loosened, the bolt can be moved in the slot r, and the switch can be moved until the line 2, comes in contact with the line 3, by which movement the groove b, is closed and a rectilinear groove is opened on the line 6, in which the tongue c, can travel, and which is used when a straight saw is to be operated upon while the curved groove b, is used for circular saws.

O, represents a bent connecting bar, the hub d, of which is hung loosely upon the neck of the screw shaft D, while its thin end is secured within or to the nut H; the lower face of this bar O, rests and can slide on the bed piece C, while its upper face exerts a pressure upon the nut G, and pushes it upward in the groove F.

P, represents two cylindrical rods which are formed with gripping jaws f, to hold the saw firmly, the rods P have their bearings at g, and h, in the plates A, and can be turned in said bearings by means of their curved ends m, to open and close the jaws f.

o represents two set screws which are intended to hold between them the saw tooth next to the one which is operated upon to prevent the saw from vibrating. s, and u, represent clamps for clamping the plates A, together when the saw is secured between them.

The operation of this machine is as follows:—The saw represented in red lines Fig. 1, being a circular saw, it is held between the gripping jaws f, and the tooth to be filed or shaped is placed on the anvil C, in the manner represented in Fig. 1, the saw is then clamped by the set screws o, and the bur E, is operated by turning the crank N, and thus cuts away the back of the tooth; by turning the hand wheel M, the screw D, feeds the bur to its work, but at the same time it moves the bar O, forward, which raises the nut G, and thus causes the shafts D, and Q, to turn on the tongue c, as their fulcrum, and thus the position of the bur E is changed as the work progresses in such a manner as to correspond to the curved shape of the back of the tooth of a circular saw, whereby the bur can operate effectually on said teeth. For sharpening a straight saw, the bar O, is removed and the switch $p$, is moved up so as to close the groove $b$, and open a straight groove below it; the tooth to be sharpened is then placed again on to the bed piece C, and the bur will now be fed in a rectilinear direction as the tongue $c$, will follow the straight groove; the set screws $o$, are inserted into the holes $q$, for clamping the tooth next to the one sharpened, and the operation can now proceed without any further change in the machine, which is thus arranged for forming the teeth upon straight as well as upon circular saws.

Having thus fully described the nature of my invention, what I claim therein as new, and desire to secure by Letters Patent is.

1. The movable curved switch $p$, in conjunction with the curved groove F, for the purpose of adapting the machine to the cutting of teeth on, setting, or sharpening the teeth of straight, as well as circular saws, substantially as herein described.

2. I also claim operating and feeding the bur by means of the shaft Q, turning within the hollow screw shaft D, when applied to a saw sharpener substantially in the manner, and for the purpose herein described.

3. I also claim the bed piece or anvil C, for the purpose of supporting the saw tooth while being sharpened, substantially as herein described.

4. I also claim in combination with the bur E, and the anvil C. the clamps $f, f$, for gaging and firmly holding the saw, while being acted upon, substantially as described.

K. H. KINNE.

Witnesses:
C. GOODWIN,
O. C. WHITNEY.